Oct. 1, 1957
R. H. POTTS ET AL  2,808,426
PREPARATION OF NITRILES
Filed Jan. 26, 1956
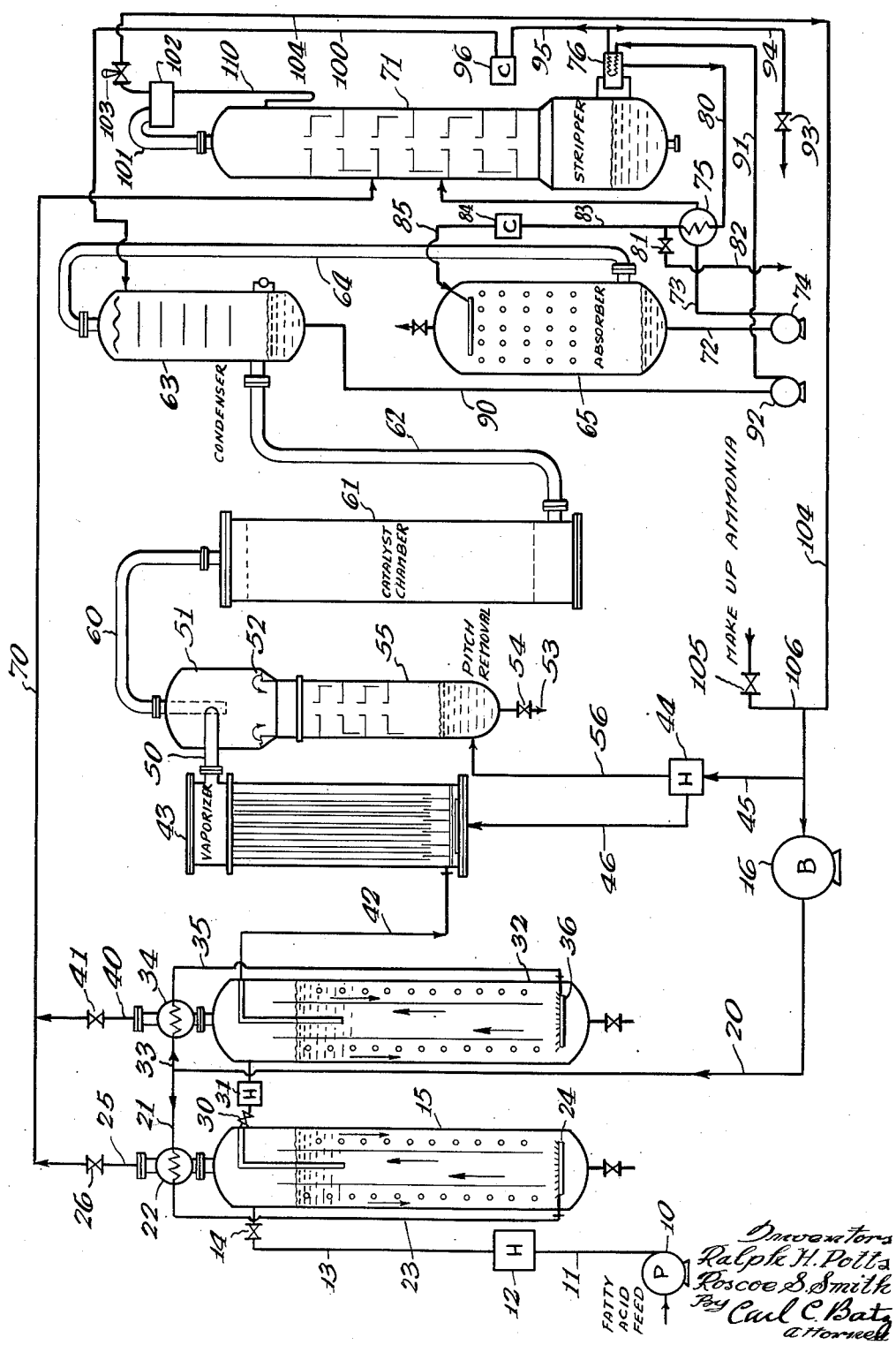
Inventors
Ralph H. Potts
Roscoe S. Smith
By Carl C. Batz
Attorney United States Patent Office 2,808,426
Patented Oct. 1, 1957

2,808,426

PREPARATION OF NITRILES

Ralph H. Potts and Roscoe S. Smith, La Grange, Ill., assignors to Armour and Company, Chicago, Ill., a corporation of Illinois Application January 26, 1956, Serial No. 561,417

16 Claims. (Cl. 260—465.2)

This invention relates to the preparation of nitriles. In a preferred aspect, this invention relates to an improved method for preparing aliphatic nitriles having straight chain hydrocarbon groups of from 8 to 22 carbon atoms.

Nitriles, and particularly the long-chain aliphatic nitriles, are interesting chemicals and are useful for a number of things, as for example, as plasticizers for acrylonitrile and vinyl polymers, as plasticizers for synthetic fibers, as insecticides, and as yarn lubricants in textile spinning. They are also useful in mineral ore concentration processes. However, their most important use by far is as a starting material in the production of other chemicals, especially primary and secondary amines which are themselves extremely versatile chemicals.

The most common method for producing nitriles is to treat carboxylic acids with ammonia, usually in the presence of a catalyst. The reactions involved in the conversion of the acids to the nitriles have been postulated as including the following chemical changes:

(1) $RCOOH + NH_3 \rightleftharpoons RCOONH_4$
(2) $RCOONH_4 \rightleftharpoons RCONH_2 + H_2O$
(3) $2RCONH_2 \rightarrow RCN + RCOOH + NH_3$ Various methods and techniques have been described in the literature for effecting the above conversion. For example a method is disclosed in Ralston et al. Patent No. 2,061,314 in which the reaction is conducted in the liquid phase and a catalyst is employed to prevent clogging by soaps, low-boiling acids, etc. In this method the nitriles are withdrawn from the reaction chamber after the conversion is completed. In U. S. Patent No. 2,314,894 to Potts et al., there is disclosed a method which is an improvement over that of Ralston et al. In this method, ammonia is continuously admixed with a body of the fatty acid substance in liquid phase in a heated liquid phase conversion zone and there is continuously withdrawn therefrom an effluent vapor mixture containing nitriles formed in the liquid phase conversion zone together with fatty acids, amides, ammonia, and water of reaction. This vapor mixture is continuously passed to a heated vapor phase conversion zone containing a dehydration catalyst to convert fatty acids and amides in said vapors to nitriles while in the presence of the vaporized nitriles which have been vaporized from the liquid phase conversion zone. The effluent from the vapor phase conversion zone is passed to a condenser where the nitriles are liquefied and recovered as product.

In its principal respects, the present invention is an improvement of the method disclosed in Potts et al. 2,314,894. It is a general object of this invention to provide an improved method for the production of nitriles.

It is another object of this invention to provide a continuous process for the production of nitriles in which less catalysts are employed and less down time for catalyst regeneration is required.

It is a further object of this invention to provide a process for the production of nitriles which requires a shorter period of time for completion than previously known processes.

It is still another object of this invention to provide a process for the preparation of nitriles by which a purer product is achieved than in previously known methods.

Further and additional objects of this invention will become apparent to those skilled in the art from the specification and drawing in which there is illustrated schematically a preferred embodiment.

In practicing the method of this invention, the starting material employed is a carboxylic acid having an aliphatic or cycloaliphatic hydrocarbon radical containing from 8 to 22 carbon atoms. The preferred starting materials are mixed fatty acids which are obtained by the hydrolysis of fats or oils such as tallow, soybean oil, coconut oil, cottonseed oil, and the like. Also commercially pure acid such as caprylic, capric, lauric, myristic, palmitic, stearic, oleic, linoleic, linolenic, and others of the higher fatty acids can be employed. One can also use as a starting material in the present process tall oil which is a by-product of paper manufacture containing resin acids and $C_{18}$ unsaturated acids such as oleic, linoleic, and linolenic. The cycloaliphatic acids contained in wood rosin exemplary of which are abietic, dihydroabietic, dehydroabietic, pimaric, colophonic, and the like, can also be employed. It will be appreciated, of course, that the conditions pertaining in the several reaction zones of the present process will vary depending upon the nature of the starting material.

Referring now to the drawing in detail, the feed stock, which for purposes of this description will be a mixture of fatty acids derived from the hydrolysis of tallow, is continuously passed by means of pump 10 via line 11 into heater 12 where it is heated to a temperature of about 170° C., but below boiling point of the acids. The thus-heated feed stock in liquid form passes continuously via line 13 through valve 14 into the top of a first reaction zone 15 where it is admixed with ammonia in a molar ratio of about 1 to 5 mols. of $NH_3$ per mol. of feed. Ammonia is continuously fed to zone 15 by means of blower 16 via lines 20 and 21, through heat exchanger 22 and line 23. The ammonia enters zone 15 at the bottom and is dispersed upwardly through the liquid feed stock by means of a sparger 24 which provides continuous agitation for the reaction mixture. If desired, a catalyst such as iron or zinc soap can be employed in a concentration range of about 0.1% to 0.5% by weight. Zone 15 is maintained at a temperature in the range of 160° C. to 180° C. and a pressure of between 70 and 100 pounds per square inch gauge. Under these conditions the fatty acid feed stock is converted to the corresponding amide after a residence of about 45 to 120 minutes. Continuously venting from zone 15 through heat exchanger 22, line 25 and valve 26 is a gaseous mixture consisting essentially of water of reaction and ammonia. It is preferred to maintain the conditions in zone 15 such that no vaporization of fatty material takes place, although this is sometimes difficult when the feed stock contains some lower boiling, shorter chain components. Valve 26 can be regulated to control the pressure in zone 15.

The fatty amide in the liquid form is continuously withdrawn from the top of zone 15 through regulating valve 30 and passes into heater 31 where the temperature is raised to about 300° C., but again, below the boiling point of the amide. The thus-heated fatty amide is continuously fed to the top of a second reaction zone 32 where it is admixed with more ammonia in a molar ratio of about 1 to 4 mols. of $NH_3$ per mol. of amide. As in zone 15, ammonia is continuously fed to zone 32 by means of blower 16 via lines 20 and 33 through heat exchanger 34 and line 35. The ammonia enters zone 32 at the bottom and is dispersed upwardly to the liquid by means of a sparger 56. Zone 32 is maintained at a temperature in the range of 290 to 320° C. and a pressure of between 70 and 100 lbs. per square inch gauge, but less than the pressure in zone 15. Under these conditions the fatty amide is between 70 and 90 percent converted to the corresponding nitrile after a residence of about 45 to 90 minutes. There is continuously vented from zone 32 through heat exchanger 34, line 40 and valve 41 a gaseous mixture consisting essentially of water of reaction and ammonia. It is preferred to maintain the conditions in zone 32 such that all of the water of reaction is vented but that little or no vaporization of fatty nitrile, fatty amide, or unconverted fatty acid takes place.

The reaction mixture, substantially free of water of reaction, in liquid form containing unconverted amide and acids and between 70 and 90 weight percent of fatty nitrile, is continuously withdrawn from the top of zone 32 through line 42 and passes to a vaporizing zone 43 where the mixture is vaporized and admixed with a further quantity of gaseous ammonia, preferably in a molar ratio of from 5 to 25 mols. of NH₃ per mol. of unconverted material. The gaseous ammonia is admitted to the bottom of zone 43 after a temperature adjustment in heater 44 through lines 45 and 46. The heat necessary to effect vaporization in zone 43 can be supplied by any conventional means, as for example, by a Dowtherm heater. When leaving zone 43 the vapor mixture is at a temperature in the range of from 300° to 340° C., and passes continuously via line 50 into a tangential separating chamber 51 where the high boiling liquid fractions, such as pitch and other undesirable polymeric material are removed, collected in reservoir 52, and stripped of its volatile material by being subjected to a stream of superheated NH₃ gas which enters the stripping tower 55 through line 56. The residue or pitch after being stripped is withdrawn through line 54 and pumped to storage. The quantity of ammonia entering the bottom of column 55 is not critical but should be admitted in sufficient quantity to thoroughly strip the pitch of volatile material.

The vaporized reaction mixture free of pitch is passed via line 60 to a third reaction zone containing activated aluminum oxide or any other suitable dehydration catalyst. Exemplary of dehydration catalysts which can be employed in reaction zone 61 are activated alumina, silica gel and bauxite. Under the conditions pertaining in reaction zone 61, viz., a temperature in the range of from 330° to 350° C. and a pressure in the range of from 2 to 15 p. s. i. g., the unconverted amide and acid is converted into nitrile in a very short period of time. The residence time in zone 61 is of the order of from 2 to 20 seconds.

Although in the drawing the third reaction zone 61 is illustrated as comprising only one catalyst chamber, it will be appreciated that one or more catalyst chambers can be employed, connected either in series or in parallel. A very common practice in catalytic reactions is to employ two catalyst chambers connected in parallel, one catalyst chamber being regenerated while the other is in use. In the present instance the catalyst can be regenerated by blowing with a mixture of air and steam.

The gaseous effluent leaving reaction zone 61 via line 62 is passed to a condensing zone 63 where the fatty nitrile is liquefied and recovered as a product in the process. Ammonia and water vapor which are not condensed in zone 63 are passed via line 64 to an absorber 65, which is part of an ammonia recovery system which will be described more fully hereinafter.

Ammonia and water vapors from first reaction zone 15 and second reaction zone 32 are collected in line 70 and passed to a stripping column 71, near the top thereof. Said column 71 utilizes principally heat and pressure to effect separation of the ammonia. In the operation of column 71 an aqueous ammonia liquor from the bottom of absorber 65 is passed via lines 72 and 73 by means of pump 74 through heat exchanger 75 and enters the column near the center at a temperature of approximately 125° C. The heat necessary to provide the ammonia liquor at this temperature is provided by the hot stripped liquor from the bottom of column 71 which is passed from receiver and reboiler 76 via line 80 through heat exchanger 75. After giving up some of its heat in exchanger 75 part of this stripped liquor is removed through valve 81 in drain line 82. The remainder is passed via line 83 to a cooler 84 and then via line 85 to the top of absorber 65 where it is dispersed by means of a sparger 86 and contacts the vapors entering through line 64. Although heat for column 71 is supplied by the usual heating means in the bottom thereof, this is in part supplemented by passing the hot nitrile product condensed in zone 63 via lines 90 and 91 by means of pump 92 to receiver and reboiler 76. After leaving reboiler 76 most of the liquid nitrile product is passed via line 95 to cooler 96 where it is cooled and then pumped via line 100 to zone 63 where it functions as coolant to condense more nitrile. The condensed nitrile product is collected in the base of tower 63 and the excess product is pumped to storage through level control valve 93 and line 94.

Hot ammonia and water vapors issue from the top of column 71 through line 101, condenser 102 and pressure regulating valve 103 into recycle line 104 where it is continuously fed to the various reaction zones. Makeup ammonia as needed is added through valve 105 and line 106. Pressure regulating valve 103 is set to maintain a pressure of approximately 100 lbs. p. s. i. g. in column 71. In condenser 102 the ammonia gas containing a quantity of water vapor is cooled to a temperature of approximately 50° C. at which temperature the water condenses. Part of this water is continuously recycled via line 110 to the top of column 71 as reflux.

In a modification of our invention not illustrated in the drawing, the first and second reaction zones can be maintained in one elongated vessel in which hot feed stock material continuously enters at the top, or one end, of the vessel and a substantially anhydrous liquid product containing between about 70 and 90 weight percent of nitrile is continuously withdrawn from the opposite end of the vessel and passed to the vaporizing zone as hereinbefore described. The ammonia is admitted into counter-current contact with the liquid material at different points along the length of the elongated vessel, for example, at the center and at the bottom or opposite end. The conditions of temperature prevailing in the two zones can be maintained by heating elements appropriately arranged in the vessel. Ammonia and water of reaction from both of the reaction zones continuously vents from the top of the vessel, or the end at which the feed stock material enters and passes to the ammonia recovery system via line 70 as described in connection with the drawing.

By operating the present improved process, it is possible to obtain a pure nitrile product which contains as low as about 0.05% of unconverted acids. In general, the nitrile product produced in accordance with our process will contain between about 0.05 and 0.15 weight percent of unconverted acids. This represents a substantial improvement over nitrile products produced in accordance with the Potts et al. process mentioned herein above. The presence and quantity of unconverted acids is an extremely significant factor when the nitrile product is subsequently used for the production of amines. Not only does the presence of these acids deleteriously affect the process for producing the amines, but their presence also has an adverse effect upon the properties of the resulting amines. Thus, it can be readily seen that a pure nitrile product is extremely desirable.

As mentioned hereinbefore, the description of the drawing is representative of a preferred embodiment of the present invention in which tallow fatty acids are employed as a feed stock material. The conditions of temperature and pressure pertaining in the various zones of reaction will vary depending upon the nature of the feed stock material employed. These conditions can, in general, be ascertained from the known physical properties of the feed stock material. Also, for convenience and clarity, certain apparatus such as pumps, tanks, accumulators, certain valves, etc. have not been shown in the drawing. Obviously, various modifications of the present invention can be practised without departing from the spirit and scope of the invention.

We claim:

1. In a process for the production of a nitrile of the formula RCN, R being selected from the group consisting of aliphatic and cycloaliphatic hydrocarbon radicals having from 8 to 22 carbon atoms, from the corresponding carboxylic acid thereof, the steps which comprise continuously contacting the acid in the liquid phase in a first reaction zone with ammonia for a period and under conditions sufficient to convert substantially all of said acid to the corresponding amide; continuously passing amide in the liquid phase from said first zone into a second reaction zone where it is contacted with ammonia under conditions and for a period sufficient to convert at least 70% of said amide into the corresponding nitrile; continuously venting from both said reaction zones substantially only ammonia and water of reaction; continuously passing substantially anhydrous liquid nitrile, amide and unconverted acid from said second zone to a vaporization zone and then in the vapor state in admixture with ammonia to one end of a third reaction zone containing a dehydration catalyst for a period and under conditions sufficient to convert substantially all of said acid and amide to nitrile; continuously passing the vapors from said third zone to a condensing zone and recovering therefrom liquid nitrile product.

2. A process according to claim 1 wherein the mixture of water of reaction and ammonia vented from the first and second reaction zones is passed to a separating zone and the ammonia recovered therefrom continuously recycled to each of three reaction zones.

3. A process according to claim 1 wherein the vaporized material from the vaporization zone is passed to a pitch removal zone and pitch and polymeric products are removed therefrom.

4. A process according to claim 1 wherein a mixture of fatty acids derived from tallow is employed as the feed stock.

5. A process according to claim 1 wherein a mixture of fatty acids derived from coconut oil is employed as the feed stock.

6. A process according to claim 1 wherein a mixture of fatty acids derived from soybean oil is employed as the feed stock.

7. A process according to claim 1 wherein activated aluminum oxide is employed as a dehydration catalyst in the third reaction zone.

8. In a process for the production of a nitrile of the formula RCN, R being selected from the group consisting of aliphatic and cycloaliphatic hydrocarbon radicals having from 8 to 22 carbon atoms, from the corresponding carboxylic acid thereof, the steps which comprise continuously contacting the acid in the liquid phase with from 2 to 5 mols. of ammonia per mol. of acid in a first reaction zone maintained at a temperature of from 160° to 180° C. and a pressure of from 70 to 100 pounds per square inch gauge for a period of from 45 to 120 minutes to convert substantially all of said acid to the corresponding amide; continuously passing amide in the liquid phase from said first zone into a second reaction zone where it is contacted with from 1 to 4 mols. of ammonia per mol. of amide at a temperature in the range of from 290° to 320° C. and a pressure of from 70 to 100 lbs. per square inch gauge, for a period of from 45 to 90 minutes to convert at least 70% of said amide into the corresponding nitrile; continuously venting from both said zones substantially only ammonia and water of reaction; continuously passing substantially anhydrous mixture of nitrile, amide and unconverted acid from said second zone to a vaporization zone and then in the vaporous state in admixture with from 5 to 25 mols. of $NH_3$ per mol. of unreacted material at a temperature of from 330 to 350° C. into one end of a third reaction zone containing a dehydration catalyst for a period of from 2 to 20 seconds to convert substantially all of said acid and amide to nitrile; and continuously passing from said third reaction zone vapors to a condensing zone and recovering therefrom liquid nitrile as a product of the process.

9. A process according to claim 8 wherein the mixture of ammonia and water of reaction vented from the first and second reaction zones is passed to a separating zone and the ammonia recovered therefrom recycled to each of the three reaction zones.

10. A process according to claim 8 wherein the vaporized material from the vaporization zone is passed to a pitch removal zone and pitch and polymeric products are removed therefrom.

11. A process according to claim 8 wherein the feed stock employed is a mixture of fatty acids derived from tallow.

12. A process according to claim 8 wherein the feed stock employed is a mixture of fatty acids derived from coconut oil.

13. A process according to claim 8 wherein the feed stock employed is a mixture of fatty acids derived from soybean oil.

14. A process according to claim 8 wherein the dehydration catalyst employed in the third reaction zone is an activated aluminum oxide catalyst.

15. A process according to claim 8 wherein the nitrile product recovered from said condensing zone contains about between 0.05 and 0.15 weight percent of unconverted acids.

16. A process according to claim 1 wherein said first and second reaction zones are maintained in one elongated zone in which hot feed stock material continuously enters at one end of the elongated zone and a substantially anhydrous liquid product containing between about 70 and 90 weight percent of nitrile is continuously withdrawn from the opposite end of said elongated zone.

References Cited in the file of this patent

UNITED STATES PATENTS

| | | |
|---|---|---|
| 2,314,894 | Potts et al. | Mar. 30, 1943 |
| 2,448,275 | Potts | Aug. 31, 1948 |
| 2,732,397 | Hull | Jan. 24, 1956 |